(12) United States Patent
Zhu

(10) Patent No.: US 11,438,743 B2
(45) Date of Patent: Sep. 6, 2022

(54) METHOD AND APPARATUS FOR INDICATING MULTI-SERVICE DATA MULTIPLEX TRANSMISSION, TERMINAL AND BASE STATION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 138 days.

(21) Appl. No.: 16/720,527

(22) Filed: Dec. 19, 2019

(65) Prior Publication Data

US 2020/0128376 A1    Apr. 23, 2020

Related U.S. Application Data

(63) Continuation of application No. PCT/CN2017/095796, filed on Aug. 3, 2017.

(51) Int. Cl.
*H04W 4/50* (2018.01)
*H04W 76/27* (2018.01)
*H04W 48/16* (2009.01)
*H04W 72/04* (2009.01)
*H04W 80/02* (2009.01)

(52) U.S. Cl.
CPC ............ *H04W 4/50* (2018.02); *H04W 48/16* (2013.01); *H04W 72/042* (2013.01); *H04W 76/27* (2018.02); *H04W 80/02* (2013.01)

(58) Field of Classification Search
CPC ....... H04W 4/50; H04W 76/27; H04W 48/16; H04W 72/042; H04W 80/02
See application file for complete search history.

(56) References Cited

U.S. PATENT DOCUMENTS

| | | | |
|---|---|---|---|
| 11,044,739 B2* | 6/2021 | Li | .......... H04L 27/2692 |
| 2018/0167164 A1* | 6/2018 | Lin | .......... H04L 1/00 |
| 2018/0184440 A1* | 6/2018 | Lin | .......... H04W 72/0473 |
| 2018/0255532 A1* | 9/2018 | Li | .......... H04L 1/18 |
| 2019/0132823 A1* | 5/2019 | Sano | .......... H04W 74/02 |

(Continued)

FOREIGN PATENT DOCUMENTS

| | | | |
|---|---|---|---|
| CN | 101959069 A | 1/2011 | |
| CN | 106301699 A | 1/2017 | |

(Continued)

OTHER PUBLICATIONS

NTT Docomo, Inc., "On multiplexing of eMBB and URLLC in downlink," R1-1700626, 3GPP Sg Ran WG1 AH_NR Meeting, Spokane, USA, Jan. 16-20, 2017.

(Continued)

*Primary Examiner* — Michael J Moore, Jr.
(74) *Attorney, Agent, or Firm* — Syncoda LLC; Feng Ma

(57) ABSTRACT

A method for indicating multi-service data multiplex transmission includes: detecting that a first service data multiplexes a first transmission resource pre-allocated to a second service data, the first transmission resource being a transmission resource capable of multiplex transmission of the first service data and second service data; and sending an occupation indication information to the terminal, such that the terminal receives the second service data according to the occupation indication information.

9 Claims, 11 Drawing Sheets

(56) References Cited

U.S. PATENT DOCUMENTS

| | | | |
|---|---|---|---|
| 2019/0342043 A1* | 11/2019 | Fan | H04W 72/1289 |
| 2020/0015277 A1* | 1/2020 | Shi | H04W 72/042 |
| 2020/0052864 A1* | 2/2020 | Hosseinian | H04L 5/0094 |
| 2020/0077470 A1* | 3/2020 | Xiong | H04W 88/06 |
| 2020/0128376 A1* | 4/2020 | Zhu | H04W 80/02 |
| 2020/0128534 A1* | 4/2020 | Zhu | H04L 41/0803 |

FOREIGN PATENT DOCUMENTS

| | | | |
|---|---|---|---|
| CN | 106888079 A | 6/2017 | |
| CN | 106941724 A | 7/2017 | |
| CN | 107223358 A | 9/2017 | |
| CN | 107241288 A | 10/2017 | |
| CN | 107734676 A | 2/2018 | |
| WO | 2015165029 A | 11/2015 | |
| WO | 2017059829 A2 | 3/2017 | |

OTHER PUBLICATIONS

Intel Corporation, "Frame structure considerations for URLLC," R1-167127, 3GPP TSG RAN WG1 Meeting #86, Gothenburg, Sweden Aug. 22-26, 2016.

International Search Report in PCT/CN2017/095796 dated Apr. 18, 2018.

* cited by examiner

METHOD AND APPARATUS FOR INDICATING MULTI-SERVICE DATA MULTIPLEX TRANSMISSION, TERMINAL AND BASE STATION

CROSS-REFERENCE TO RELATED APPLICATION

This application is a continuation of International Application No. PCT/CN2017/095796 filed on Aug. 3, 2017, the disclosure of which is hereby incorporated by reference in its entirety.

BACKGROUND

The emergence of new generations of internet applications such as Augmented Reality (AR), Virtual Reality (VR), and vehicle-to-vehicle communications has placed higher demands on wireless communication technologies. At present, cellular mobile communication technology is in the evolution stage of next-generation technology. An important feature of the next-generation technology is to support flexible configuration of multiple service types.

Different service types have different requirements for wireless communication technologies. For example, the main requirements for enhanced mobile broadband (eMBB) service types are focused on large bandwidth and high speed, the main requirements of the Ultra Reliable Low Latency Communication (URLLC) service type are focused on high reliability and low latency, and the main requirements of the massive machine Type Communication (mMTC) service type are focused on the large number of connections.

SUMMARY

The present disclosure relates generally to the fields of communication technologies, and more specifically to a method and apparatus for indicating multi-service data multiplex transmission, a method and apparatus for multi-service data multiplex transmission, a terminal, a base station, and a computer-readable storage medium.

According to a first aspect of the present disclosure, a method for indicating multi-service data multiplex transmission is provided, the method includes:

detecting that a first service data multiplexes a first transmission resource pre-allocated to a second service data, the first transmission resource being a transmission resource capable of multiplex transmission of the first service data and the second service data;

sending an occupation indication information to a terminal for the terminal to receive the second service data according to the occupation indication information.

In some embodiments, the method further includes:

notifying the terminal of an available transmission location of the first service data on each transmission unit by a predefined manner, radio resource control RRC signaling, media access control MAC control element CE or physical layer signaling for the terminal to receive the first service data at the available transmission location before detecting that a first service data multiplexes a first transmission resource pre-allocated to a second service data.

In some embodiments, the occupation indication information includes at least one of a time domain resource occupation indication information and a frequency domain resource occupation indication information, the time domain resource occupation indication information is indicated based on a time domain transmission unit structure of the first service data, a time domain transmission unit structure of the second service data or a predefined time domain transmission unit structure; a time domain transmission unit of the first service data, a time-frequency transmission unit of the second service data or a predefined time-frequency transmission unit includes the first transmission resource and the second transmission resource, the second transmission resource is used to transmit the second service data, a priority of the first service data is higher than that of the second service data.

In some embodiments, the method further includes:

sending a correspondence between different occupation indication information and whether there is the first service data transmission at the available transmission location to the terminal by a predefined manner, radio resource control RRC signaling, media access control MAC control element CE or physical layer signaling before sending an occupation indication information to the terminal.

In some embodiments, the occupation indication information is carried in the RRC signaling, the MAC CE or the physical layer signaling.

In some embodiments, when the occupation indication information is carried in the physical layer signaling, the occupation indication information is sent at a fixed position of a downlink control information DCI with a fixed or configurable information length.

According to a second aspect of the present disclosure, a method for multi-service data multiplex transmission is provided, the method includes:

receiving an occupation indication information sent by a base station, the occupation indication information is sent by the base station after detecting that a first service data multiplexes a first transmission resource pre-allocated to a second service data, the first transmission resource is a transmission resource capable of multiplex transmission of the first service data and the second service data;

receiving the second service data according to the occupation indication information.

In some embodiments, the occupation indication information includes at least one of a time domain resource occupation indication information and a frequency domain resource occupation indication information, the time domain resource occupation indication information is indicated based on a time domain transmission unit structure of the first service data, a time domain transmission unit structure of the second service data or a predefined time domain transmission unit structure; a time domain transmission unit of the first service data, a time-frequency transmission unit of the second service data or a predefined time-frequency transmission unit includes the first transmission resource and the second transmission resource, the second transmission resource is used to transmit the second service data, a priority of the first service data is higher than that of the second service data.

In some embodiments, the method further includes:

receiving and saving the correspondence (between different occupation indication information and whether there is the first service data transmission at an available transmission location configured by the base station for the first service data) sent by a base station through a predefined manner, radio resource control RRC signaling, media access control MAC control element CE or physical layer signaling before the receiving an occupation indication information sent by the base station.

In some embodiments, the occupation indication information is carried in the RRC signaling, the MAC CE or the physical layer signaling.

In some embodiments, when the occupation indication information is carried in the physical layer signaling, the occupation indication information is sent at a fixed position of a downlink control information DCI with a fixed or configurable information length.

According to a third aspect of the present disclosure, an apparatus for indicating multi-service data multiplex transmission is provided, the apparatus includes:

a detecting module, configured to detect that a first service data multiplexes a first transmission resource pre-allocated to a second service data, the first transmission resource being a transmission resource capable of multiplex transmission of the first service data and the second service data;

a first sending module, configured to send an occupation indication information to a terminal after the detecting module detects that a first service data multiplexes a first transmission resource pre-allocated to a second service data for the terminal to receive the second service data according to the occupation indication information.

In some embodiments, the apparatus further includes:

a notification module, configured to notify the terminal of an available transmission location of the first service data on each transmission unit by a predefined manner, radio resource control RRC signaling, media access control MAC control element CE or physical layer signaling before the detecting module detects that the first service data multiplexes the first transmission resource pre-allocated to the second service data for the terminal to receive the first service data at the available transmission location.

In some embodiments, the occupation indication information includes at least one of a time domain resource occupation indication information and a frequency domain resource occupation indication information, the time domain resource occupation indication information is indicated based on a time domain transmission unit structure of the first service data, a time domain transmission unit structure of the second service data or a predefined time domain transmission unit structure; a time domain transmission unit of the first service data, a time-frequency transmission unit of the second service data or a predefined time-frequency transmission unit includes the first transmission resource and a second transmission resource, the second transmission resource is used to transmit the second service data, a priority of the first service data is higher than that of the second service data.

In some embodiments, the apparatus further includes:

a second sending module, configured to send a correspondence between different occupation indication information and whether there is the first service data transmission at the available transmission location to a terminal by a predefined manner, radio resource control RRC signaling, media access control MAC control element CE or physical layer signaling before the first sending module sends an occupation indication information to the terminal.

In some embodiments, the occupation indication information is carried in the RRC signaling, the MAC CE or the physical layer signaling.

In some embodiments, when the occupation indication information is carried in the physical layer signaling, the occupation indication information is sent at a fixed position of a downlink control information DCI with a fixed or configurable information length.

According to a fourth aspect of the present disclosure, an apparatus for multi-service data multiplex transmission is provided, the apparatus includes:

a first receiving module, configured to receive an occupation indication information sent by a base station, the occupation indication information is sent by the base station after detecting that a first service data multiplexes a first transmission resource pre-allocated to a second service data, the first transmission resource being a transmission resource capable of multiplex transmission of the first service data and the second service data.

a second receiving module, configured to receive the second service data according to the occupation indication information received by the first receiving module.

In some embodiments, the occupation indication information includes at least one of a time domain resource occupation indication information and a frequency domain resource occupation indication information, the time domain resource occupation indication information is indicated based on a time domain transmission unit structure of the first service data, a time domain transmission unit structure of the second service data or a predefined time domain transmission unit structure, a time domain transmission unit of the first service data, a time-frequency transmission unit of the second service data or a predefined time-frequency transmission unit includes the first transmission resource and a second transmission resource, the second transmission resource is used to transmit the second service data, a priority of the first service data is higher than that of the second service data.

In some embodiments, the apparatus further includes:

a receiving and saving module, configured to receive and save a correspondence between (different occupation indication information and whether there is a first service data transmission at an available transmission location configured by the base station for the first service data) sent by a base station through a predefined manner, radio resource control RRC signaling, media access control MAC control element CE or physical layer signaling before the first receiving module receives an occupation indication information sent by the base station.

In some embodiments, the occupation indication information is carried in the RRC signaling, the MAC CE or the physical layer signaling.

In some embodiments, when the occupation indication information is carried in the physical layer signaling, the occupation indication information is sent at a fixed position of a downlink control information DCI with a fixed or configurable information length.

According to a fifth aspect of the present disclosure, a base station is provided, including:

a processor;

a memory for storing executable instructions of the processor;

where the processor is configured to:

detect that a first service data multiplexes a first transmission resource pre-allocated to a second service data, the first transmission resource being a transmission resource capable of multiplex transmission of the first service data and the second service data;

send an occupation indication information to a terminal for the terminal to receive the second service data according to the occupation indication information.

According to a sixth aspect of the present disclosure, a terminal is provided, including:

a processor;

a memory for storing executable instructions of the processor;

where the processor is configured to:

receive an occupation indication information sent by a base station, the occupation indication information is sent by the base station after detecting that a first service data multiplexes a first transmission resource pre-allocated to a second service data, the first transmission resource being a transmission resource capable of multiplex transmission of the first service data and the second service data;

receive the second service data according to the occupation indication information.

According to a seventh aspect of the present disclosure, a computer readable storage medium is provided, in which a computer program is stored, the above steps of the method for indicating multi-service data multiplex transmission are carried out when the computer program is executed by a processor, the method including:

detecting that a first service data multiplexes a first transmission resource pre-allocated to a second service data, the first transmission resource being a transmission resource capable of multiplex transmission of the first service data and the second service data;

sending an occupation indication information to a terminal for the terminal to receive the second service data according to the occupation indication information.

According to an eighth aspect of the present disclosure, a computer readable storage medium is provided, in which a computer program is stored, the above steps of the method for multi-service data multiplex transmission are carried out when the computer program is executed by a processor, the method including:

receiving an occupation indication information sent by a base station, the occupation indication information is sent by the base station after detecting that a first service data multiplexes a first transmission resource pre-allocated to a second service data, the first transmission resource being a transmission resource capable of multiplex transmission of the first service data and the second service data;

receiving the second service data according to the occupation indication information.

It should be noted that the above general description and the following detailed description are merely exemplary and explanatory and not intended to limited the disclosure.

BRIEF DESCRIPTION OF THE DRAWINGS

The accompanying drawings here, which are incorporated in the disclosure and constitute a part of this specification, illustrate embodiments consistent with the present disclosure and explain the principles of the present disclosure in conjunction with the specification.

DETAILED DESCRIPTION

Exemplary embodiments will be described in detail herein, examples of which are illustrated in the accompanying drawings. When the following description refers to the accompanying drawings, unless otherwise indicated, the same numbers in different accompanying figures indicate the same or similar elements. The embodiments described in the following exemplary embodiments do not represent all embodiments consistent with the present disclosure. Instead, they are merely examples of apparatuses and methods consistent with aspects of the disclosure as detailed in the appended claims.

In order to efficiently multiplex and transmit resources, different service types can be separately transmitted by using different time-frequency resources statically or semi-statically. For example, the same time domain resource and different frequency domain resources may be used to transmit different service types data, and the same frequency domain resource and different time domain resources may be used to transmit different service types data.

However, through using different time-frequency resources statically or semi-statically to transmit different service types separately, the transmission resource utilization rate is lower.

A next-generation of wireless communication systems may require flexible and configurable designs to support the transmission of multiple types of services.

Various embodiments of the present disclosure can address that, as different services have different performance requirements, how to effectively multiplex transmission resources when different services need to transmit data in the same working frequency band.

Figure 1:
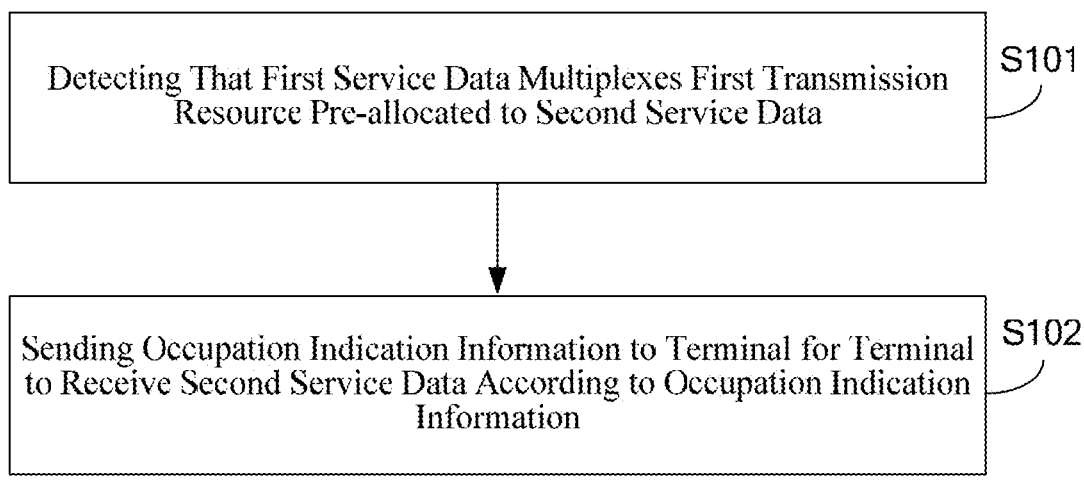
FIG. 1 is a flowchart showing a method for indicating multi-service data multiplex transmission according to an exemplary embodiment of the present application.

FIG. 1 is a flowchart showing a method for indicating multi-service data multiplex transmission according to an exemplary embodiment of the present application. The embodiment is described from a base station side. As shown in FIG. 1, the method for indicating multi-service data multiplex transmission includes:

In step S101, detecting that a first service data multiplexes a first transmission resource pre-allocated to a second service data, the first transmission resource is a transmission resource capable of multiplex transmission of the first service data and the second service data.

In some embodiments, the priority of the first service data is higher than that of the second service data, for example, the first service data has higher latency requirements than the second service data. The first service data may include, but is not limited to, URLLC data, and the second service data may include, but is not limited to, eMBB data.

Assuming that the base station allocates a first resource to the eMBB data, at this time, the URLLC data needs to be transmitted. Since the eMBB data and the URLLC data can both be transmitted on the first resource and the URLLC data has higher latency requirements than the eMBB data, the URLLC data needs to be transmitted on the first resource to meet the latency requirement.

In step S102, sending an occupation indication information to a terminal for the terminal to receive the second service data according to the occupation indication information.

In some embodiments, the occupation indication information may include at least one of a time domain resource location and a frequency domain resource location occupied by the first service data.

When the occupation indication information includes a time domain resource location occupied by the first service data, the time domain resource location may be indicated based on a time domain transmission unit structure of the first service data, or may be indicated based on a time domain transmission unit structure of the second service data, and may also be indicated based on a predefined or agreed time domain transmission unit structure.

In some embodiments, the above described time domain transmission unit of the first service data, the time-frequency transmission unit of the second service data, and the predefined or default time-frequency transmission unit may transmit service data in units of slot, subframes or radio frames and the like. Each time-frequency transmission unit may include a first transmission resource and a second transmission resource, and the second transmission resource may be used to transmit the second service data.

The above described terminal is a terminal that receives the second service data, and the terminal can obtain a transmission location of the first service data according to the received occupation indication information, so as to obtain a transmission location of the second service data, so that the second service data can be accurately received.

In the above described embodiment, after detecting that the first service data multiplexes the first transmission resource pre-allocated to the second service data, the occupation indication information is sent to the terminal, so that the terminal can accurately receive the second service data according to the occupation indication information, and the utilization rate of the transmission resource is improved.

Figure 2A:
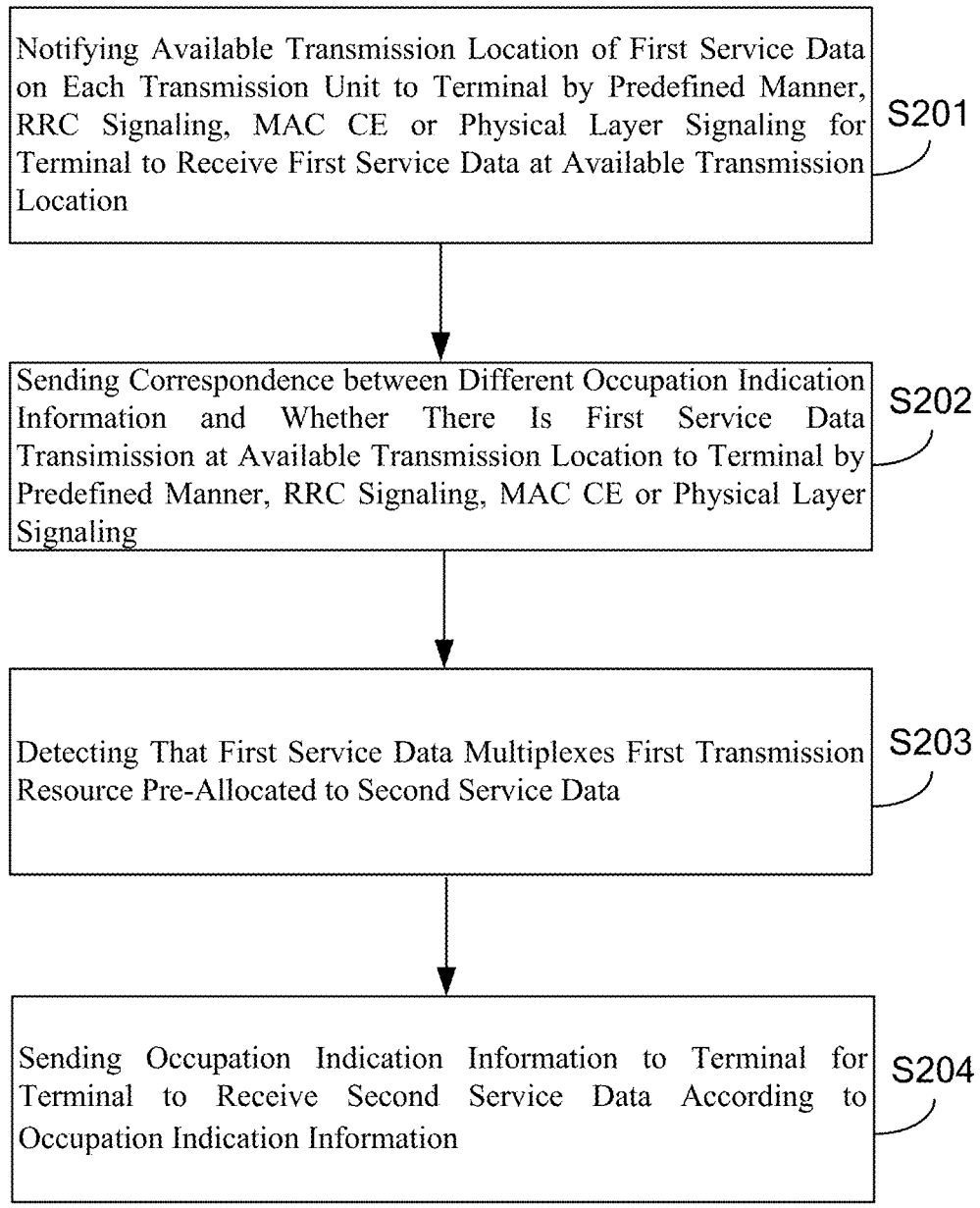
FIG. 2A is a flowchart showing another method for indicating multi-service data multiplex transmission according to an exemplary embodiment of the present application.

FIG. 2A is a flowchart showing another method for indicating multi-service data multiplex transmission according to an exemplary embodiment of the present application. As shown in FIG. 2A, the method may include:

In step S201, notifying the terminal of an available transmission location of the first service data on each transmission unit by a predefined manner, radio resource control (RRC) signaling, media access control (MAC) control element (CE) or physical layer signaling for the terminal to receive the first service data at the available transmission location.

In this embodiment, the first service data is the URLLC service data, and the second service data is the eMBB service data as an example. The available transmission locations on different transmission units may be the same or different. The following uses a transmission unit as an example to describe the available transmission locations on the transmission unit.

Figure 2B:
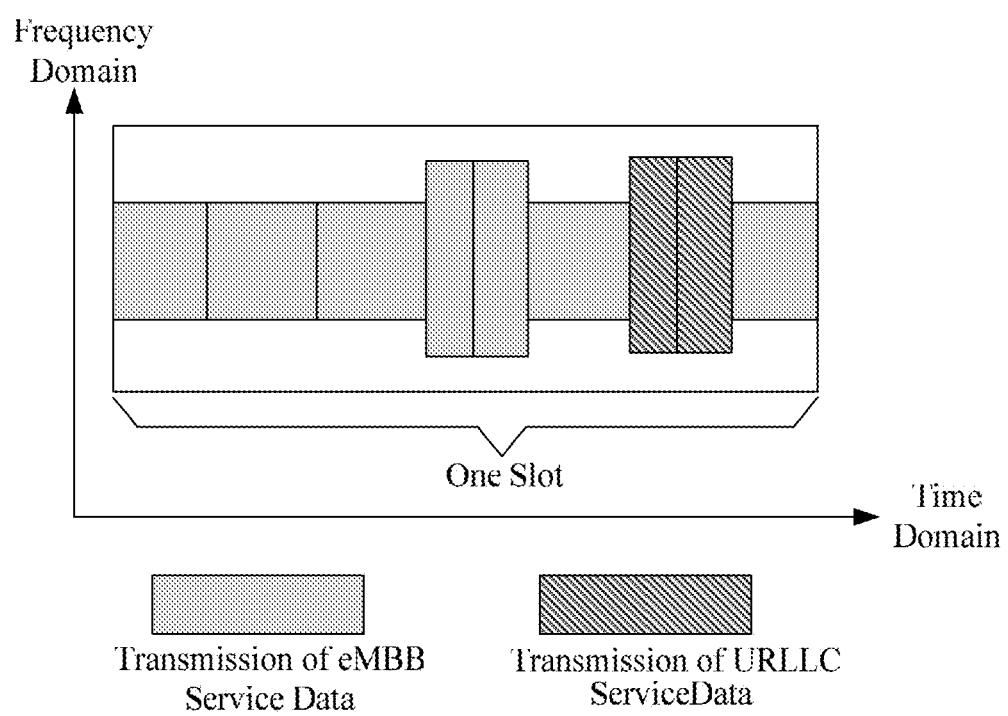
FIG. 2B is a schematic diagram showing multiplexing and transmitting multi-service data by a transmission unit according to an exemplary embodiment of the present application.

As shown in FIG. 2B, the transmission unit is a transmission unit of the second service data, such as the eMBB service data, the transmission unit transmits service data in units of one slot, and the slot includes 7 symbols. Suppose the base station notifies the terminal that the available transmission location of the first service data on the transmission unit is the fourth symbol and the sixth symbol through RRC signaling, MAC CE or physical layer signaling, and the second transmission resource is the remaining five symbols.

In some embodiments, the terminal in step S201 is a terminal that receives the first service data, and after receiving the available transmission location of the first service data on each transmission unit, the terminal may receive the first service data at the corresponding available transmission location.

In step S202, sending a correspondence between the different occupation indication information and whether there is a first service data transmission at the available transmission location to the terminal by a predefined manner, RRC signaling, MAC CE or physical layer signaling.

In this embodiment, the correspondence between the different occupation indication information and whether there is a first service data transmission at the available transmission location may be sent to the terminal by using multiple manners, such as a predefined manner, RRC signaling, MAC CE or physical layer signaling.

In some embodiments, the terminal in the step S202 is a terminal that receives the second service data. It should be noted that the terminal that receives the first service data and the terminal that receives the second service data may be the same terminal or different terminals.

The available transmission location of a transmission unit of the eMBB service data shown in FIG. 2B is taken as an example to describe the correspondences between different time domain resource occupation indication information and whether there is a first service data transmission at the available transmission location. Since the available transmission location of one transmission unit of the eMBB service data shown in FIG. 2B is two symbols, the time domain resource occupation indication information may be described by using 2-bit information, and the correspondence described may be as shown in Table 1.

Specifically, Table 1 lists example correspondence between the time-frequency resource occupation indication information and whether there is first service data transmission at the available transmission location.

TABLE 1

| Time domain indication information | Whether there is first service data transmission at the available transmission location |
|---|---|
| 00 | No first service data transmission on the 4th symbol and the 6th symbol |
| 01 | First service data transmission on the 6th symbol |
| 10 | First service data transmission on the 4th symbol |
| 11 | First service data transmission on the 4th symbol and the 6th symbol |

In addition, the first service data, for example, a transmission unit of the URLLC service data, may be used as an example to describe the correspondence between the different occupation indication information and whether there is first service data transmission at the available transmission location. For example, as shown in FIG. 2B, assuming that there are two opportunities for transmitting URLLC service data on the 4th symbol and the 6th symbol, the transmission unit has four opportunities to transmit URLLC service data, that is, the time domain resource occupation indication information may be described by using 4-bit information, and the correspondence described may be as shown in Table 2, for convenience of description, the two opportunities for transmitting URLLC service data on the 4th symbol and the 6th symbol are referred to as a first part and a second part, respectively.

Specifically, Table 2 lists example correspondence between the time-frequency resource occupation indication information and whether there is first service data transmission at the available transmission location.

TABLE 2

| Time domain indication information | Whether there is first service data transmission at the available transmission location |
|---|---|
| 0000 | No first service data transmission on the 4th symbol and the 6th symbol |
| 0001 | First service data transmission on the second part of the 6th symbol |
| 0010 | First service data transmission on the first part of the 6th symbol |
| 0011 | First service data transmission on the 6th symbol |
| 0100 | First service data transmission on the second part of the 4th symbol |
| 0101 | First service data transmission on the second part of the 4th symbol and the second part of the 6th symbol |
| 0110 | First service data transmission on the second part of the 4th symbol and the first part of the 6th symbol |
| 0111 | First service data transmission on the second part of the 4th symbol and the 6th symbol |
| 1000 | First service data transmission on the first part of the 4th symbol |
| 1001 | First service data transmission on the first part of the 4th symbol and the second part of the 6th symbol |
| 1010 | First service data transmission on the first part of the 4th symbol and the first part of the 6th symbol |
| 1011 | First service data transmission on the first part of the 4th symbol and the 6th symbol |
| 1100 | First service data transmission on the 4th symbol |
| 1101 | First service data transmission on the 4th symbol and the second part of the 6th symbol |
| 1110 | First service data transmission on the 4th symbol and the first part of the 6th symbol |
| 1111 | First service data transmission on the 4th symbol and the 6th symbol |

It should be noted that the above described Tables 1 and 2 are only the correspondences of the transmission unit examples according to the structure shown in FIG. 2B. In practical applications, the above described correspondences may be described according to different structures of different transmission units.

In step S203, detecting that the first service data multiplexes the first transmission resource pre-allocated to the second service data, the first transmission resource is a transmission resource capable of multiplex transmission of the first service data and the second service data.

It should be noted that the above described steps S202 and S203 have no strict execution order, that is, step S202 may be performed first, then step S203 may be performed, or step S203 may be performed first, and then step S202 may be performed.

In step S204, sending the occupation indication information to the terminal for the terminal to receive the second service data according to the occupation indication information.

In some embodiments, the occupation indication information may be carried in RRC signaling, MAC CE or physical layer signaling. When the occupation indication information is carried in the physical layer signaling, the occupation indication information may be sent at a fixed position of the downlink control information (DCI) with a fixed or configurable information length.

In this embodiment, the terminal in step S204 is a terminal that receives the second service data.

Assuming that the base station selects to transmit URLLC service data on two URLLC transmission opportunities of the sixth symbol, the base station may send an occupation indication information to the terminal that receives the second service data after detecting that the URLLC service data is transmitted on the first transmission resource.

In some embodiments, the occupation indication information may include a time domain resource location and a frequency domain resource location occupied by the first service data. The time domain resource location may be indicated based on a time domain transmission unit structure of the first service data, for example, may be indicated based on the structures of a fourth symbol and a sixth symbol in FIG. 2B. Assuming that the base station selects to transmit the first service data, such as the URLLC service data, on the two URLLC transmission opportunities of the sixth symbol, the occupation indication information may be represented by 0011. After receiving the occupation indication information, the terminal may obtain the first service data to be transmitted on the sixth symbol by querying the table 2, thereby the second service data may be received on the fourth symbol. In addition, the terminal may also receive the second service data on the second transmission resource, that is, the terminal may receive the second service data on the six symbols except the sixth symbol.

In the above described embodiment, the correspondence between the different occupation indication information and whether there is a first service data transmission at the available transmission location is sent to the terminal by a predefined manner, RRC signaling, MAC CE or physical layer signaling, thereby conditions for the terminal obtains a transmission location of the first service data according to the correspondence after the terminal receiving the occupation indication information are provided, and conditions for improving utilization rate of the transmission resource are provided.

Figure 3:
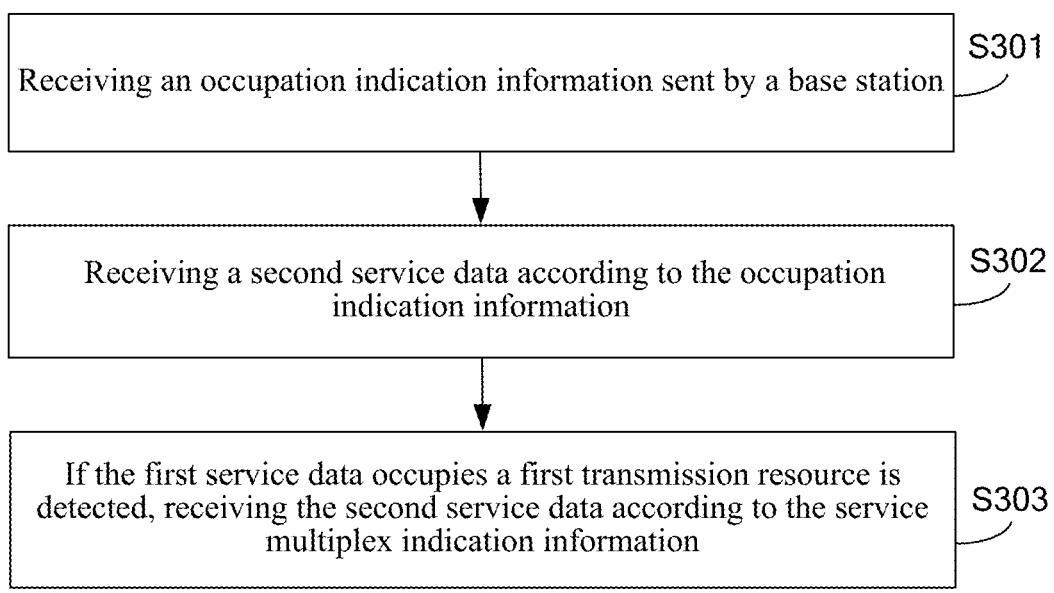
FIG. 3 is a flowchart showing a method for multi-service data multiplex transmission according to an exemplary embodiment of the present application.

FIG. 3 is a flowchart showing a method for multi-service data multiplex transmission according to an exemplary embodiment of the present application. The embodiment is described from a terminal side, as shown in FIG. 3, the method for multi-service data multiplex transmission includes:

In step S301, receiving an occupation indication information sent by a base station, the occupation indication information is sent by the base station after detecting that the first service data multiplexes the first transmission resource pre-allocated to the second service data, the first transmission resource is a transmission resource capable of multiplex transmission of the first service data and the second service data.

In some embodiments, the priority of the first service data is higher than that of the second service data, for example, the first service data has higher latency requirements than the second service data. The first service data may include, but is not limited to, URLLC data, and the second service data may include, but is not limited to, eMBB data.

In this embodiment, the occupation indication information may include at least one of a time domain resource location and a frequency domain resource location occupied by the first service data.

When the occupation indication information includes a time domain resource location occupied by the first service data, the time domain resource location may be indicated based on a time domain transmission unit structure of the first service data, or may be indicated based on a time domain transmission unit structure of the second service data, and may also be indicated based on a predefined or agreed time domain transmission unit structure.

In some embodiments, the above described time domain transmission unit of the first service data, the time-frequency transmission unit of the second service data, and the predefined or default time-frequency transmission unit may transmit service data in units of slot, subframes or radio frames and the like. Each time-frequency transmission unit may include a first transmission resource and a second transmission resource, and the second transmission resource may be used to transmit the second service data.

In addition, the occupation indication information may be carried in RRC signaling, MAC CE or physical layer signaling. When the occupation indication information is carried in the physical layer signaling, the occupation indication information may be sent by the base station at a fixed position of the DCI with a fixed or configurable information length.

In step S302, receiving the second service data according to the occupation indication information.

In this embodiment, after receiving the occupation indication information, the terminal may obtain a transmission location of the second service data according to the occupation indication information, and receive the second service data according to the transmission location of the second service data.

In the above described embodiment, the occupation indication information sent by the base station is received, and the second service data is accurately received according to the occupation indication information, thereby implementing multiplex transmission of the multi-service data and improving the utilization rate of the transmission resource.

In step S303, if the first service date occupies a first transmission response is detected, receiving the second service according to the service multiplex indication information.

Figure 4:
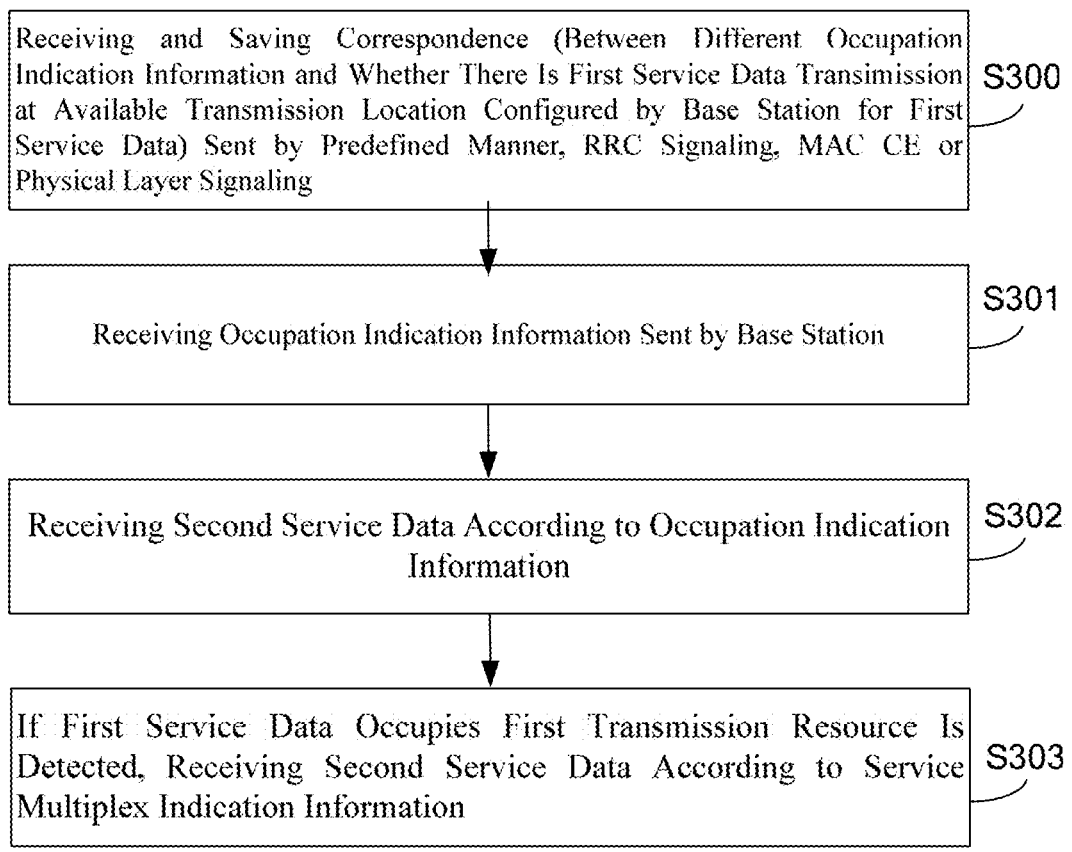
FIG. 4 is a flowchart showing another method for multi-service data multiplex transmission according to an exemplary embodiment of the present application.

FIG. 4 is a flowchart showing another method for multi-service data multiplex transmission according to an exemplary embodiment of the present application. As shown in FIG. 4, before step S301, the method may further include:

In step S300, receiving and saving the correspondence (sent by the base station) between the different occupation indication information and whether there is a first service data transmission at the available transmission location configured by the base station for the first service data through a predefined manner, RRC signaling, MAC CE or physical layer signaling.

In this embodiment, the correspondence (sent by the base station) between the different occupation indication information and whether there is a first service data transmission at the available transmission location may be received through multiple manners, such as a predefined manner, RRC signaling, MAC CE or physical layer signaling. In the embodiment, the correspondence between the different occupation indication information and whether there is a first service data transmission at the available transmission location may be as shown in Table 1 and Table 2.

After receiving the occupation indication information, the terminal can obtain the transmission location of the first service data by querying the above described correspondence, and further obtain the transmission location of the second service data, thereby the first service data and the second service data can be received.

In the above described embodiment, the correspondence (sent by the base station) between the different occupation indication information and whether there is a first service data transmission at the available transmission location is received by a predefined manner, RRC signaling, MAC CE or physical layer signaling, therefore, the transmission location of the first service data and the transmission location of the second service data may be obtained according to the received occupation indication information and the above described correspondence.

Figure 5:
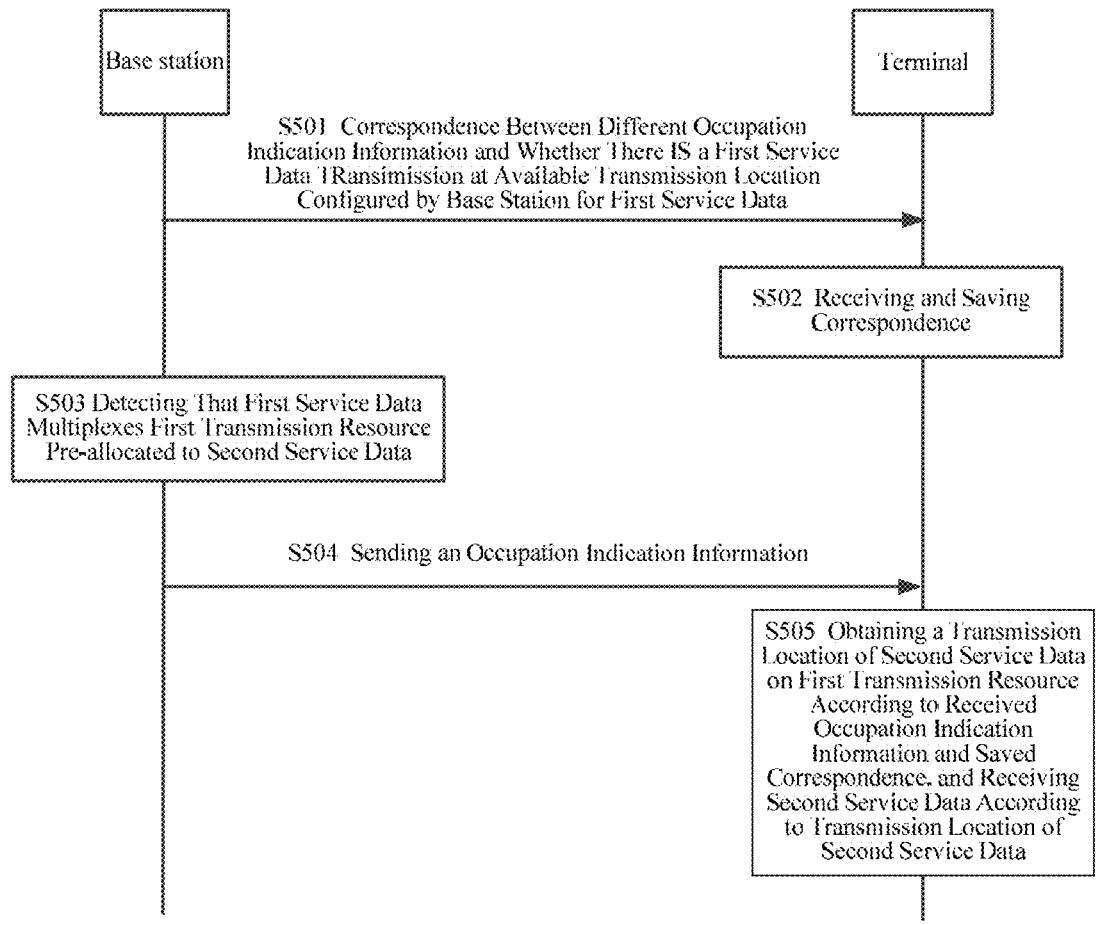
FIG. 5 is a signaling flowchart showing a method for multi-service data multiplex transmission according to an exemplary embodiment of the present application.

FIG. 5 is a signaling flowchart showing a method for multi-service data multiplex transmission according to an exemplary embodiment of the present application, this embodiment describes an example in which a terminal transmits two types of service data through multiplex. As shown in FIG. 5, the method includes:

In step S501, the base station sending the correspondence between the different occupation indication information and whether there is a first service data transmission at the available transmission location configured by the base station for the first service data to the terminal through the RRC signaling.

In step S502, the terminal receiving and saving the correspondence.

In step S503, the base station detecting that a first service data multiplexes a first transmission resource pre-allocated to a second service data.

In step S504, the base station sending an occupation indication information to a terminal.

In step S505, the terminal obtaining a transmission location of the second service data on the first transmission resource according to the received occupation indication information and the saved correspondence, and receiving the second service data according to the transmission location of the second service data.

In this embodiment, the terminal may obtain a transmission location of the first service data on the first transmission resource according to the received occupation indication information and the saved correspondence, and then, the transmission location of the first service data is removed from the transmission location corresponding to the first transmission resource, and the transmission location of the second service data is obtained.

In above described embodiment, through the interaction between the base station and the terminal, After the base station detects that the first service data multiplexes the first transmission resource that is pre-allocated to the second service data, the occupation indication information is sent to the terminal, so that the terminal can accurately receive the second service data according to the occupation indication information, and the utilization rate of the transmission resources is improved.

Figure 6:
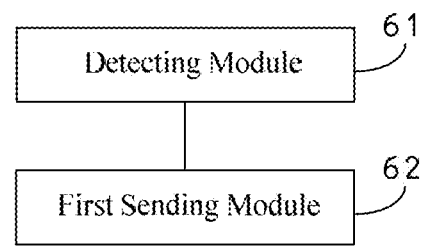
FIG. 6 is a block diagram showing an apparatus for indicating multi-service data multiplex transmission according to an exemplary embodiment.

FIG. 6 is a block diagram shown an apparatus for indicating multi-service data multiplex transmission according to an exemplary embodiment. As shown in FIG. 6, the apparatus for indicating multi-service data multiplex transmission includes: a detecting module 61 and a first sending module 62.

The detecting module 61 is configured to detect that a first service data multiplexes a first transmission resource pre-allocated to a second service data, the first transmission resource is a transmission resource capable of multiplex transmission of the first service data and the second service data.

In some embodiments, the priority of the first service data is higher than that of the second service data, for example, the first service data has higher latency requirements than the second service data. The first service data may include, but is not limited to, URLLC data, and the second service data may include, but is not limited to, eMBB data.

Assuming that the base station allocates the first resource to the eMBB data, at this time, the URLLC data needs to be transmitted. Since the eMBB data and the URLLC data can both be transmitted on the first resource and the URLLC data has higher latency requirements than the eMBB data, the URLLC data needs to be transmitted on the first resource to meet the latency requirement.

The first sending module 62 is configured to send an occupation indication information to a terminal after the detecting module 61 detecting a first service data multiplexes a first transmission resource pre-allocated to a second service data for the terminal to receive the second service data according to the occupation indication information.

In some embodiments, the occupation indication information may include at least one of a time domain resource location and a frequency domain resource location occupied by the first service data.

When the occupation indication information includes a time domain resource location occupied by the first service data, the time domain resource location may be indicated based on a time domain transmission unit structure of the first service data, or may be indicated based on a time domain transmission unit structure of the second service data, and may also be indicated based on a predefined or agreed time domain transmission unit structure.

In some embodiments, the above described time domain transmission unit of the first service data, the time-frequency transmission unit of the second service data, and the predefined or default time-frequency transmission unit may transmit service data in units of slot, subframes or radio frames and the like. Each time-frequency transmission unit may include a first transmission resource and a second transmission resource, and the second transmission resource may be used to transmit the second service data.

In this embodiment, the occupation indication information may be carried in RRC signaling, MAC CE or physical layer signaling. When the occupation indication information is carried in the physical layer signaling, the occupation indication information may be sent at a fixed position of the downlink control information (DCI) with a fixed or configurable information length.

The above described terminal is a terminal that receives the second service data, the terminal can obtain the transmission location of the first service data according to the received occupation indication information, thereby obtaining the transmission location of the second service data, thereby the second service data can be accurately received.

In the above described embodiment, after detecting that the first service data multiplexes the first transmission resource pre-allocated to the second service data, the occupation indication information is sent to the terminal, so that the terminal can accurately receive the second service data according to the occupation indication information, and the utilization rate of the transmission resource is improved.

Figure 7:
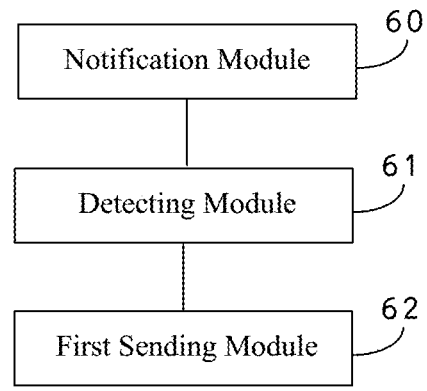
FIG. 7 is a block diagram showing another apparatus for indicating multi-service data multiplex transmission according to an exemplary embodiment.

FIG. 7 is a block diagram showing another apparatus for indicating multi-service data multiplex transmission according to an exemplary embodiment. As shown in FIG. 7, on the basis of the above described embodiment shown in FIG. 6, the apparatus may further include: a notification module 60.

The notification module 60 is configured to notify the terminal of the available transmission location of the first service data on each transmission unit by a predefined manner, radio resource control (RRC) signaling, media access control (MAC) control element (CE) or physical layer signaling before the detecting module 61 detects that the first service data multiplexes the first transmission resource pre-allocated to the second service data for the terminal to receive the first service data at the available transmission location.

In this embodiment, the first service data is the URLLC service data, and the second service data is the eMBB service data as an example. The available transmission locations on different transmission units may be the same or different. The following uses a transmission unit as an example to describe the available transmission locations on the transmission unit.

As shown in FIG. 2B, the transmission unit is a transmission unit of the second service data, such as the eMBB service data, the transmission unit transmits service data in units of one slot, and the slot includes 7 symbols. Suppose the base station notifies the terminal that the available transmission location of the first service data on the transmission unit is the fourth symbol and the sixth symbol through RRC signaling, MAC CE or physical layer signaling, and the second transmission resource is the remaining five symbols.

In the above described embodiment, the available transmission location of the first service data on each transmission unit is notified to the terminal in a plurality of manners, so that the terminal can receive the first service data at the available transmission location, thereby providing conditions for implementing multi-service type data multiplex transmission.

Figure 8:
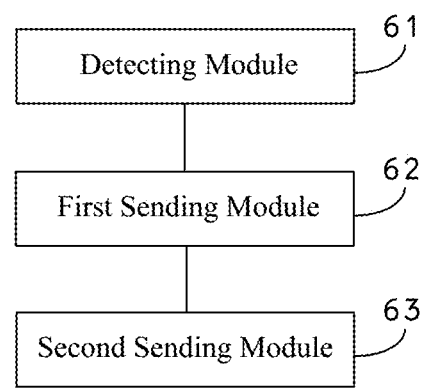
FIG. 8 is a block diagram showing another apparatus for indicating multi-service data multiplex transmission according to an exemplary embodiment.

FIG. 8 is a block diagram showing another apparatus for indicating multi-service data multiplex transmission according to an exemplary embodiment. As shown in FIG. 8, on the basis of the above described embodiment shown in FIG. 6, the apparatus may further include: a second sending module 63.

The second sending module 63 is configured to send a correspondence between the different occupation indication information and whether there is a first service data transmission at the available transmission location to the terminal by a predefined manner, radio resource control RRC signaling, media access control MAC control element CE or physical layer signaling before the first sending module sends the occupation indication information to the terminal.

In this embodiment, the correspondence between the different occupation indication information and whether there is a first service data transmission at the available transmission location is sent to the terminal through multiple manners, such as a predefined manner, RRC signaling, MAC CE or physical layer signaling.

The available transmission location of a transmission unit of the eMBB service data shown in FIG. 2B is taken as an example to describe the correspondences between different time domain resource occupation indication information and whether there is a first service data transmission at the available transmission location. Since the available transmission location of one transmission unit of the eMBB service data shown in FIG. 2B is two symbols, the time domain resource occupation indication information may be described by using 2-bit information, and the described correspondence may be as shown in Table 1.

In addition, the first service data, for example, a transmission unit of the URLLC service data, may be used as an example to describe the correspondence between the different occupation indication information and whether there is first service data transmission at the available transmission location. For example, as shown in FIG. 2B, assuming that there are two opportunities for transmitting URLLC service data on each of the 4th symbol and the 6th symbol, the transmission unit has four opportunities to transmit URLLC service data in all, that is, the time domain resource occupation indication information may be described by using 4-bit information, and the described correspondence may be as shown in Table 2.

It should be noted that the above described Tables 1 and 2 are only the correspondences of the transmission unit examples according to the structure shown in FIG. 2B. In practical applications, the above described correspondences may be described according to different structures of different transmission units.

In the above described embodiment, the correspondence between the different occupation indication information and whether there is a first service data transmission at the available transmission location is sent to the terminal by a predefined manner, RRC signaling, MAC CE or physical layer signaling, thereby conditions for the terminal obtains a transmission location of the first service data according to the correspondence after the terminal receives the occupation indication information are provided, and conditions for improving the utilization rate of the transmission resource are provided.

Figure 9:
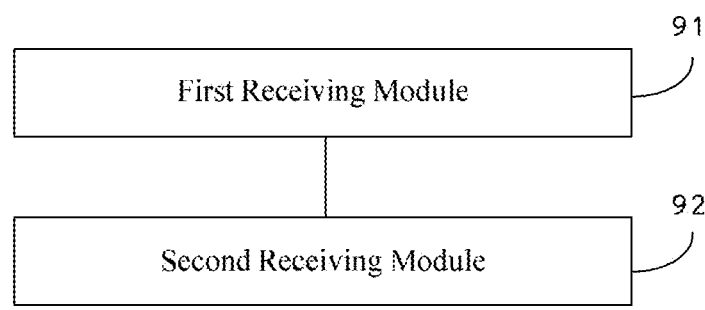
FIG. 9 is a block diagram showing an apparatus for multi-service data multiplex transmission according to an exemplary embodiment.

FIG. 9 is a block diagram showing an apparatus for multi-service data multiplex transmission according to an exemplary embodiment. As shown in FIG. 9, the apparatus may further include: a first receiving module 91 and a second receiving module 92.

The first receiving module 91 is configured to receive the occupation indication information sent by the base station, the occupation indication information is sent by the base station after detecting that the first service data multiplexes the first transmission resource pre-allocated to the second service data, the first transmission resource is a transmission resource capable of multiplex transmission of the first service data and the second service data.

In some embodiments, the priority of the first service data is higher than that of the second service data, for example, the first service data has higher latency requirements than the second service data. The first service data may include, but is not limited to, URLLC data, and the second service data may include, but is not limited to, eMBB data.

In this embodiment, the occupation indication information may include at least one of a time domain resource location and a frequency domain resource location occupied by the first service data.

When the occupation indication information includes a time domain resource location occupied by the first service data, the time domain resource location may be indicated based on a time domain transmission unit structure of the first service data, or may be indicated based on a time domain transmission unit structure of the second service data, and may also be indicated based on a predefined or agreed time domain transmission unit structure.

In some embodiments, the above described time domain transmission unit of the first service data, the time-frequency transmission unit of the second service data, and the predefined or default time-frequency transmission unit may transmit service data in units of slot, subframes or radio frames and the like. Each time-frequency transmission unit may include a first transmission resource and a second transmission resource, and the second transmission resource may be used to transmit the second service data.

In addition, the occupation indication information may be carried in RRC signaling, MAC CE or physical layer signaling. When the occupation indication information is carried in the physical layer signaling, the occupation indication information may be sent by the base station at a fixed position of the DCI with a fixed or configurable information length.

The second receiving module 92 is configured to receive the second service data according to the occupation indication information received by the first receiving module 91.

In this embodiment, after receiving the occupation indication information, the terminal may obtain a transmission location of the second service data according to the occupation indication information, and receive the second service data according to the transmission location of the second service data.

In the above described embodiment, the occupation indication information sent by the base station is received, and the second service data is accurately received according to the occupation indication information, thereby implementing multiplex transmission of the multi-service data and improving utilization rate of the transmission resource.

Figure 10:
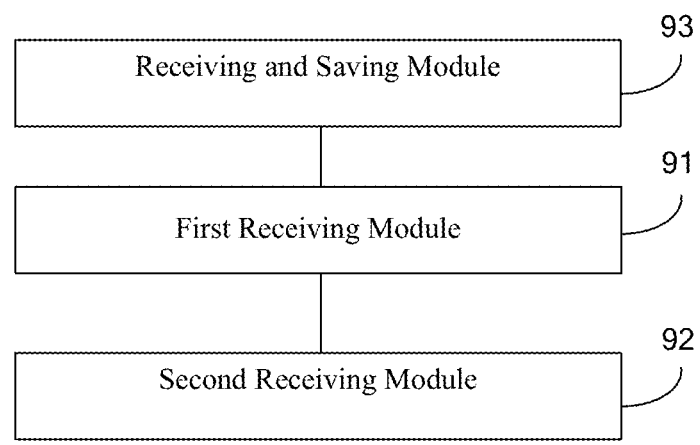
FIG. 10 is a block diagram showing another apparatus for multi-service data multiplex transmission according to an exemplary embodiment.

FIG. 10 is a block diagram showing another apparatus for indicating multi-service data multiplex transmission according to an exemplary embodiment. As shown in FIG. 10, on the basis of the above described embodiment shown in FIG. 9, the apparatus may further include: a receiving and saving module 93.

The receiving and saving module 93 is configured to receive and save the correspondence (between the different occupation indication information and whether there is a first service data transmission at the available transmission location configured by the base station for the first service data) sent by a predefined manner, radio resource control (RRC) signaling, media access control (MAC) control element (CE) or physical layer signaling before the first receiving module 91 receives the occupation indication information sent by the base station.

In this embodiment, the correspondence between the different occupation indication information and whether there is a first service data transmission at the available transmission location is sent by the base station is received through multiple manners, such as a predefined manner, RRC signaling, MAC CE or physical layer signaling. In some embodiments, the correspondence between different occupation indication information and whether there is a first service data transmission at the available transmission location may be as shown in Table 1 and Table 2.

After receiving the occupation indication information, the terminal can obtain the transmission location of the first service data by querying the above described correspondence, and further obtain the transmission location of the second service data, thereby the first service data and the second service data can be received.

In the above described embodiment, the correspondence between the different occupation indication information and whether there is a first service data transmission at the available transmission location sent by the base station is received by a predefined manner, RRC signaling, MAC CE or physical layer signaling, thereby the transmission location of the first service data and the transmission location of the second service data may be obtained according to the received occupation indication information and the above described correspondence.

Figure 11:
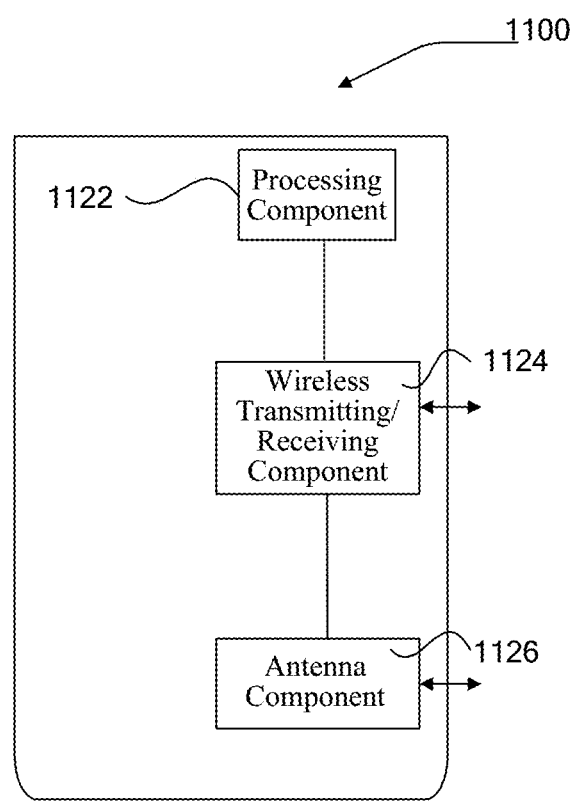
FIG. 11 is a block diagram showing an apparatus suitable for indicating multi-service data multiplex transmission according to an exemplary embodiment.

FIG. 11 is a block diagram showing an apparatus suitable for indicating multi-service data multiplex transmission according to an exemplary embodiment. The apparatus 1100 can be provided as a base station. Referring to FIG. 11, the apparatus 1100 includes a processing component 1122, a wireless transmitting/receiving component 1124, an antenna component 1126 and a signal processing portion specific to the wireless interface. The processing component 1122 can further include one or more processors.

One processor of the processing component 1122 may be configured to:

detect that a first service data multiplexes a first transmission resource pre-allocated to a second service data, the first transmission resource is a transmission resource capable of multiplex transmission of the first service data and the second service data.

send an occupation indication information to a terminal for the terminal to receive the second service data according to the occupation indication information.

Figure 12:
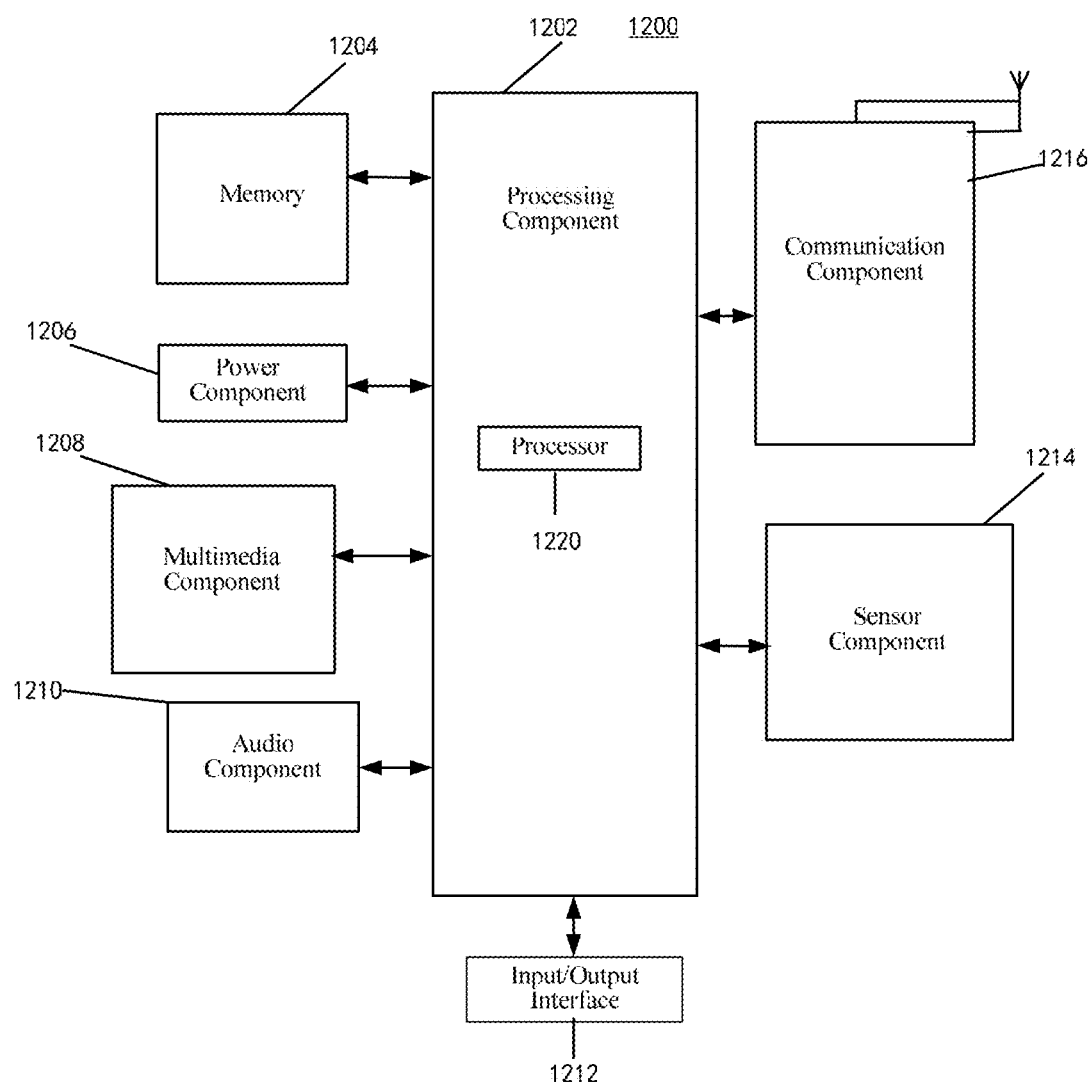
FIG. 12 is a block diagram showing an apparatus suitable for multi-service data multiplex transmission according to an exemplary embodiment.

FIG. 12 is a block diagram showing an apparatus suitable for multi-service data multiplex transmission according to an exemplary embodiment. For example, the apparatus 1200 may be a terminal, such as a mobile phone, a computer, a digital broadcast terminal, a messaging device, a game console, a tablet device, a medical device, a fitness device, a personal digital assistant and the like.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214 and a communication component 1216.

The processing component 1202 typically controls overall operations of the apparatus 1200, such as the operations associated with display, telephone calls, data communications, camera operations and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the apparatus 1200. Examples of such data include instructions for any applications or methods operated on the apparatus 1200, contact data, phonebook data, messages, pictures, video and etc. The memory 1204 may be implemented by using any type of volatile or non-volatile memory devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory and a magnetic or optical disk.

The power component 1206 provides power to various components of the apparatus 1200. The power component 1206 may include a power management system, one or more power sources and any other components associated with the generation, management and distribution of power for the apparatus 1200.

The multimedia component 1208 includes a screen providing an output interface between the apparatus 1200 and the user. In some embodiments, the screen may include a liquid crystal display (LCD) and a touch panel (TP). In some embodiments, organic light-emitting diode (OLED) or other types of displays can be employed.

If the screen includes the touch panel, the screen may be implemented as a touch screen to receive input signals from the user. The touch panel includes one or more touch sensors to sense touches, slips and gestures on the touch panel. The touch sensors may not only sense a boundary of a touch or slip action, but also sense a period of time and a pressure associated with the touch or slip action. In some embodiments, the multimedia component 1208 includes a front camera and/or a rear camera. The front camera and the rear camera may receive an external multimedia data when the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the apparatus 1200 is in an operation mode, such as a call mode, a recording mode or a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, the peripheral interface modules such as a keyboard, a click wheel, buttons and the like. These buttons may include, but are not limited to, a home button, a volume button, a starting button or a locking button.

The sensor component 1214 includes one or more sensors to provide status assessments of various aspects for the apparatus 1200. For instance, the sensor component 1214 may detect an open/closed status of the apparatus 1200, relative positioning of components, e.g., the components may be the display and the keypad of the apparatus 1200; the sensor component 1214 may also detect a change in position of the apparatus 1200 or a component of the apparatus 1200, a presence or absence of user contact with the apparatus 1200, an orientation or an acceleration/deceleration of the apparatus 1200 and a change in temperature of the apparatus 1200. The sensor component 1214 may include a proximity sensor configured to detect the presence of nearby objects without any physical contact. The sensor component 1214 may further include a light sensor, such as a CMOS or CCD image sensor configured to use in imaging applications. In some embodiments, the sensor component 1214 may further include an accelerometer sensor, a gyroscope sensor, a magnetic sensor, a pressure sensor or a temperature sensor.

The communication component 1216 is configured to facilitate communication, wired or wirelessly, between the apparatus 1200 and other devices. The apparatus 1200 can access a wireless network based on a communication standard, such as Wi-Fi, 2G, 3G, 4G, or 5G or a combination thereof. In one exemplary embodiment, the communication component 1216 receives a broadcast signal or broadcast-associated information from an external broadcast management system via a broadcast channel. In one exemplary embodiment, the communication component 1216 further includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In exemplary embodiments, the apparatus 1200 may be realized with one or more application specific integrated circuits (ASIC), digital signal processors (DSP), digital signal processing devices (DSPD), programmable logic devices (PLD), field programmable gate arrays (FPGA), controllers, micro-controllers, microprocessors or other electronic components, for performing above mentioned method.

In exemplary embodiments, there is also provided a non-transitory computer readable storage medium including instructions, for example, a memory 1204 including instructions, the above instructions may be executed by processor 1220 of apparatus 1200 to perform the above described method. For example, the non-transitory computer readable storage medium may be a ROM, a random-access memory (RAM), a CD-ROM, a magnetic tape, a floppy disk and an optical data storage device etc.

For the apparatus embodiment, since it basically corresponds to the method embodiment, refer to the partial description of the method embodiment for the relevant points. The apparatus embodiments described above are merely illustrative, the units described as separate components may or may not be physically separated, the components displayed as units may or may not be physical units, that is, may be located in one place, or may be distributed to multiple network units. Some or all of the modules may be selected according to actual needs to achieve the purpose of the solution of the embodiment. Those of ordinary skill in the art can understand and implement without any creative effort.

Various embodiments of the present disclosure can have one or more of the following advantages.

After detecting that the first service data multiplexes the first transmission resource pre-allocated to the second service data, the occupation indication information is sent to the terminal, so that the terminal can accurately receive the second service data according to the occupation indication information, and the utilization rate of the transmission resource is improved.

The available transmission location of the first service data on each transmission unit is notified to the terminal in a plurality of manners, so that the terminal can receive the first service data at the available transmission location, thereby providing conditions for implementing multi-service type data multiplex transmission.

The communication system architecture is made clearer by defining the indication manner of the time domain resource occupation indication information and the frequency domain resource occupation indication information and the structure of the time-frequency transmission unit.

The correspondence between the different occupation indication information and whether there is a first service data transmission at the available transmission location to the terminal by a predefined manner, RRC signaling, MAC CE or physical layer signaling, thereby conditions for the terminal obtains a transmission location of the first service data according to the correspondence after the terminal receives the occupation indication information are provided, and conditions for improving utilization rate of the transmission resource are provided.

The communication system architecture is made clearer by defining that the occupation indication information is carried in the RRC signaling, the MAC CE or the physical layer signaling.

The communication system architecture is made clearer by defining that the occupation indication information is sent at a fixed position of a downlink control information DCI with a fixed or configurable information length.

The occupation indication information sent by the base station is received, and the second service data is accurately received according to the occupation indication information, thereby implementing multiplex transmission of the multi-service data and improving utilization rate of the transmission resource.

The communication system architecture is made clearer by defining that the occupation indication information is carried in the RRC signaling, the MAC CE or the physical layer signaling.

The correspondence (between the different occupation indication information and whether there is a first service data transmission at the available transmission location) sent by the base station through a predefined manner, RRC signaling, MAC CE, or physical layer signaling is received, thereby the transmission location of the first service data and the transmission location of the second service data may be obtained according to the received occupation indication information and the above described correspondence.

The communication system architecture is made clearer by defining that the occupation indication information is carried in the RRC signaling, the MAC CE or the physical layer signaling.

The communication system architecture is made clearer by defining that the occupation indication information is sent at a fixed position of a downlink control information DCI with a fixed or configurable information length.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Terms used in the present disclosure are only adopted for the purpose of describing specific embodiments but not intended to limit the present disclosure. "A/an", "said" and "the" in a singular form in the present disclosure and the appended claims are also intended to include a plural form, unless other meanings are clearly denoted throughout the present disclosure.

It is to be understood that terms such as "a/an" do not represent a number limit but represent "at least one." Terms like "include" or "contain" refer to that an element or object appearing before "include" or "contain" covers an element or object and equivalent thereof listed after "include" or "contain" and does not exclude another element or object. Similar terms such as "connect" or "interconnect" are not limited to physical or mechanical connection, and may include electrical connection, either direct or indirect.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for indicating multi-service data multiplex transmission, comprising:
   detecting that a first service data multiplexes a first transmission resource pre-allocated to a second service data, the first transmission resource being a transmission resource capable of multiplex transmission of the first service data and the second service data;
   sending an occupation indication information to a terminal for the terminal to receive the second service data according to the occupation indication information; and
   notifying an available transmission location of the first service data on each transmission unit to the terminal by a predefined manner, radio resource control (RRC) signaling, media access control (MAC) control element (CE) or physical layer signaling for the terminal to receive the first service data at the available transmission location prior to the detecting that a first service data multiplexes a first transmission resource pre-allocated to a second service data;
   wherein
   the occupation indication information includes at least one of a time domain resource occupation indication information or a frequency domain resource occupation indication information, the time domain resource occupation indication information is indicated based on a time domain transmission unit structure of the first service data, a time domain transmission unit structure of the second service data or a predefined time domain transmission unit structure, a time domain transmission unit of the first service data, a time-frequency transmission unit of the second service data or a predefined time-frequency transmission unit comprises the first transmission resource and a second transmission resource, the second transmission resource is used to transmit the second service data, a priority of the first service data is higher than that of the second service data; and the method further comprises:

sending a correspondence table between different occupation indication information and whether there is the first service data transmission at the available transmission location to the terminal by a predefined manner, radio resource control RRC signaling, media access control MAC control element CE or physical layer signaling before sending an occupation indication information to the terminal.

2. The method according to claim 1, wherein, the occupation indication information is carried in the RRC signaling, the MAC CE or the physical layer signaling.

3. The method according to claim 2, wherein, when the occupation indication information is carried in the physical layer signaling, the occupation indication information is sent at a fixed position of a downlink control information DCI with a fixed or configurable information length.

4. A method for multi-service data multiplex transmission, comprising:

receiving an occupation indication information sent by a base station, the occupation indication information is sent by the base station after detecting that a first service data multiplexes a first transmission resource pre-allocated to a second service data, the first transmission resource being a transmission resource capable of multiplex transmission of the first service data and the second service data; and receiving the second service data according to the occupation indication information;

wherein the occupation indication information includes at least one of a time domain resource occupation indication information or a frequency domain resource occupation indication information, the time domain resource occupation indication information is indicated based on a time domain transmission unit structure of the first service data, a time domain transmission unit structure of the second service data or a predefined time domain transmission unit structure; a time domain transmission unit of the first service data, a time-frequency transmission unit of the second service data or a predefined time-frequency transmission unit comprises the first transmission resource and a second transmission resource, the second transmission resource is used to transmit the second service data, a priority of the first service data is higher than that of the second service data; and the method further comprises:

receiving and saving a correspondence table sent by a base station through a predefined manner, radio resource control RRC signaling, media access control MAC control element CE or physical layer signaling before the receiving an occupation indication information sent by the base station, wherein the correspondence table is between different occupation indication information and whether there is a first service data transmission at an available transmission location configured by the base station for the first service data.

5. The method according to claim 4, wherein the occupation indication information is carried in the RRC signaling, the MAC CE or the physical layer signaling.

6. The method according to claim 5, wherein when the occupation indication information is carried in the physical layer signaling, the occupation indication information is sent at a fixed position of a downlink control information DCI with a fixed or configurable information length.

7. A terminal, comprising:

a processor;

a memory, storing executable instructions of the processor;

wherein the processor is configured to:

receive an occupation indication information sent by a base station, the occupation indication information is sent by the base station after detecting that a first service data multiplexes a first transmission resource pre-allocated to a second service data, the first transmission resource being a transmission resource capable of multiplex transmission of the first service data and the second service data; and receive the second service data according to the occupation indication information;

wherein the occupation indication information includes at least one of a time domain resource occupation indication information or a frequency domain resource occupation indication information, the time domain resource occupation indication information is indicated based on a time domain transmission unit structure of the first service data, a time domain transmission unit structure of the second service data or a predefined time domain transmission unit structure; a time domain transmission unit of the first service data, a time-frequency transmission unit of the second service data or a predefined time-frequency transmission unit comprises the first transmission resource and a second transmission resource, the second transmission resource is used to transmit the second service data, a priority of the first service data is higher than that of the second service data; and the processor is further configured to:

receive and save a correspondence table sent by a base station through a predefined manner, radio resource control RRC signaling, media access control MAC control element CE or physical layer signaling before the terminal receives an occupation indication information sent by the base station, wherein the correspondence table is between different occupation indication information and whether there is the first service data transmission at an available transmission location configured by the base station for the first service data.

8. The terminal according to claim 7, wherein the occupation indication information is carried in the RRC signaling, the MAC CE or the physical layer signaling.

9. The terminal according to claim 8, wherein when the occupation indication information is carried in the physical layer signaling, the occupation indication information is sent at a fixed position of a downlink control information DCI with a fixed or configurable information length.

* * * * *